United States Patent [19]

Wagner et al.

[11] Patent Number: 4,868,437
[45] Date of Patent: Sep. 19, 1989

[54] TEMPERATURE ACTIVATED COOLING FAN ASSEMBLY

[75] Inventors: Paul D. Wagner, Little Rock; James P. Somers, Redfield, both of Ark.

[73] Assignee: Siemens Energy & Automation, Inc., Atlanta, Ga.

[21] Appl. No.: 220,050

[22] Filed: Jul. 15, 1988

[51] Int. Cl.⁴ .......................... H02K 9/06; F01P 7/02
[52] U.S. Cl. .................................. 310/78; 192/82 T; 310/63; 310/68 C; 415/123
[58] Field of Search ............. 192/82 T; 310/63, 68 C, 310/75 D, 77, 78, 62, 92; 415/122.1, 123, 12

[56] References Cited

U.S. PATENT DOCUMENTS

| | | |
|---|---|---|
| 1,374,901 | 4/1921 | Blankenhorn . |
| 1,921,042 | 8/1933 | Roos . |
| 2,516,269 | 7/1950 | Starkey ................................ 192/41 |
| 3,106,343 | 10/1963 | Holland ............................ 192/82 T |
| 3,280,352 | 10/1966 | Chapman . |
| 3,792,697 | 2/1974 | Walter et al. ..................... 192/82 T |
| 4,290,393 | 9/1981 | Hart et al. ............................. 123/41 |

FOREIGN PATENT DOCUMENTS 2014069 10/1971 Fed. Rep. of Germany .
2525408 10/1983 France .

OTHER PUBLICATIONS

Article from Popular Science, written by Steven Ashley; pp. 78-81 and 115; Jan. 1988.
Sales Brochure from Innovative Technology International Inc. for *Nitinol.*

*Primary Examiner*—Patrick R. Salce
*Assistant Examiner*—D. L. Rebsch
*Attorney, Agent, or Firm*—James G. Morrow

[57] ABSTRACT

A temperature activated fan assembly preferably for an electric motor. The assembly includes a fan, a torque transfer means engagable with the fan for transferring torque to the fan and a first member which expands in response to a temperature increase. The expansion of the first member causes the torque transfer means to engage the fan. The first member is situated within the motor such that the first member causes the fan to operate when a critical temperature in the motor is reached. The first member can be fabricated as a rod or coil from a material having a suitably high coefficient of thermal expansion. The first member can also be fabricated from a memory material.

9 Claims, 5 Drawing Sheets

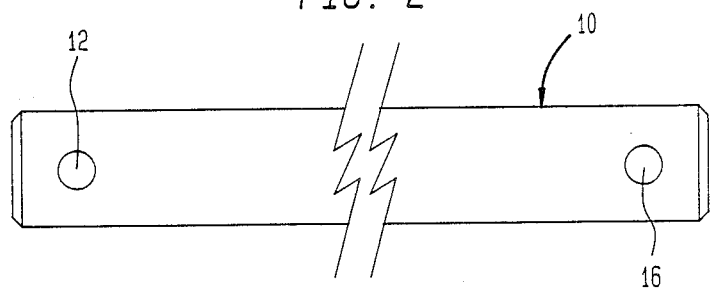
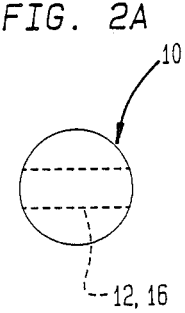
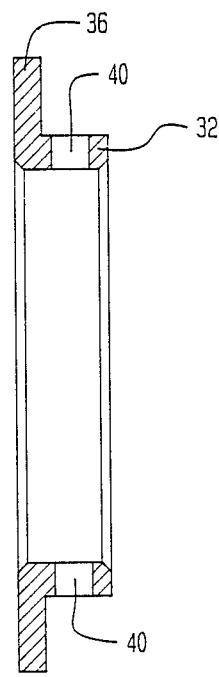
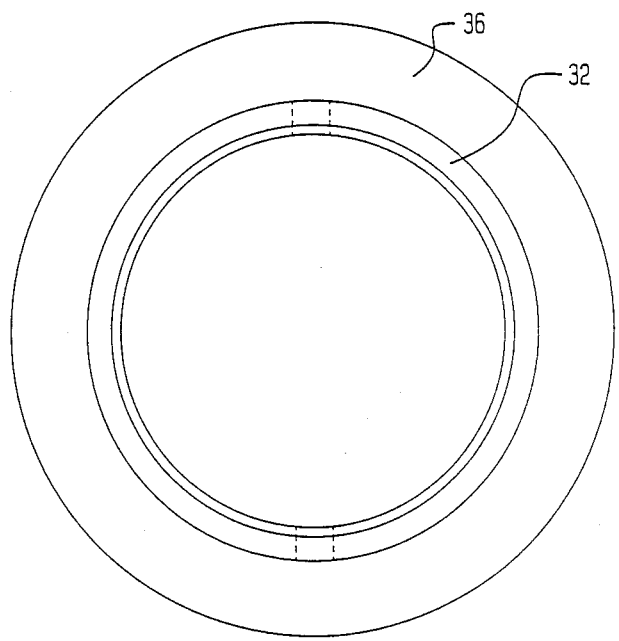

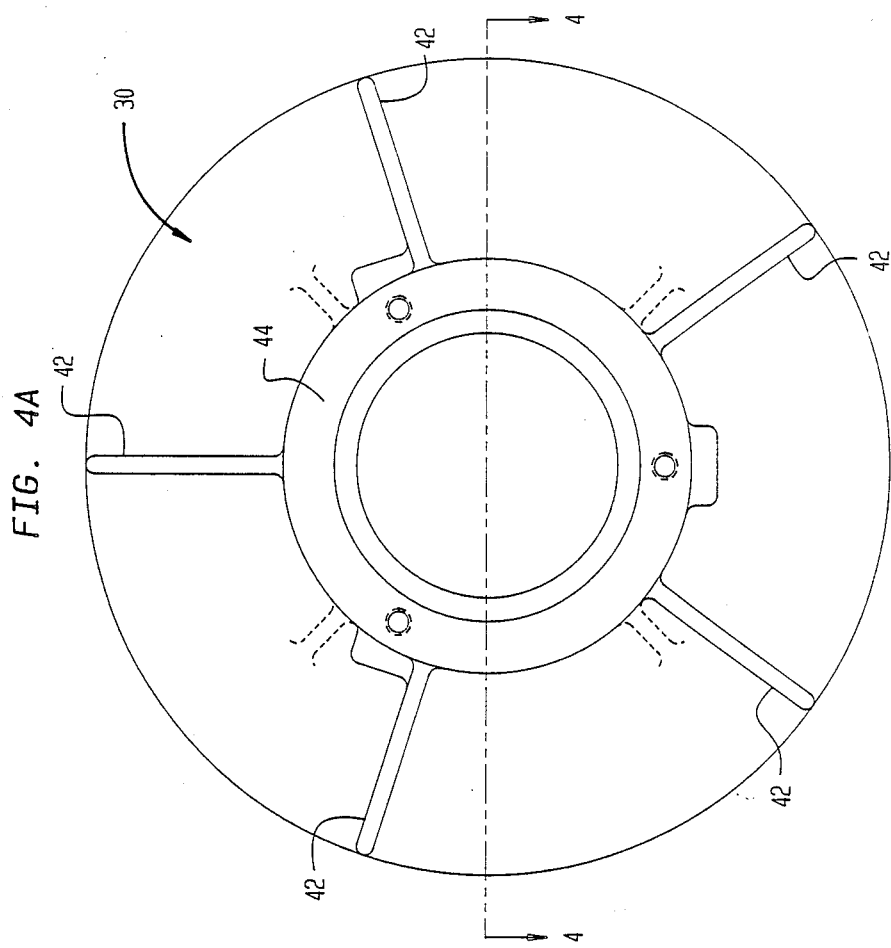
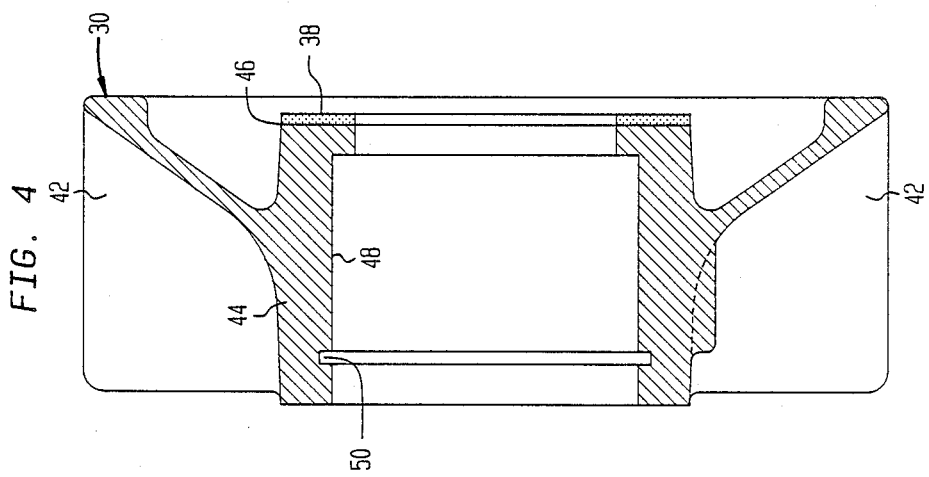

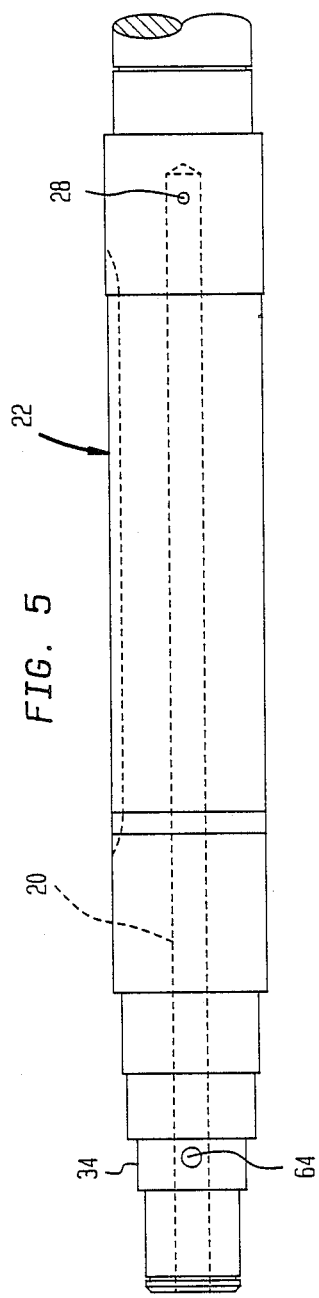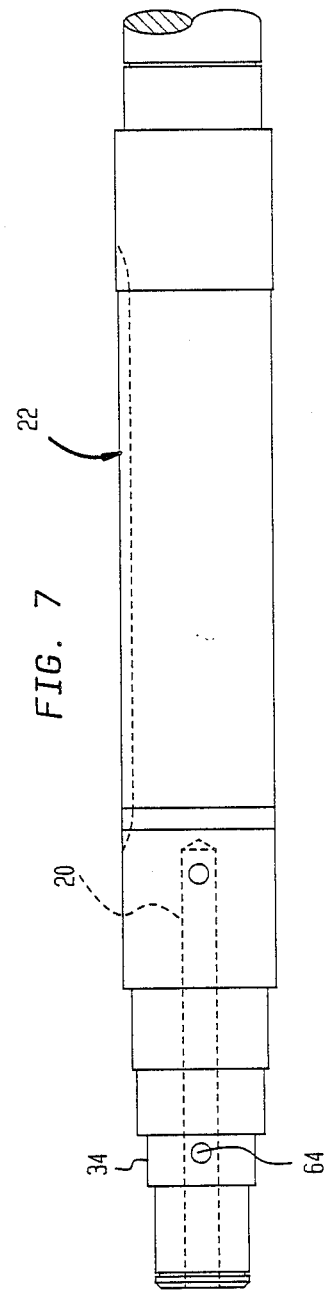

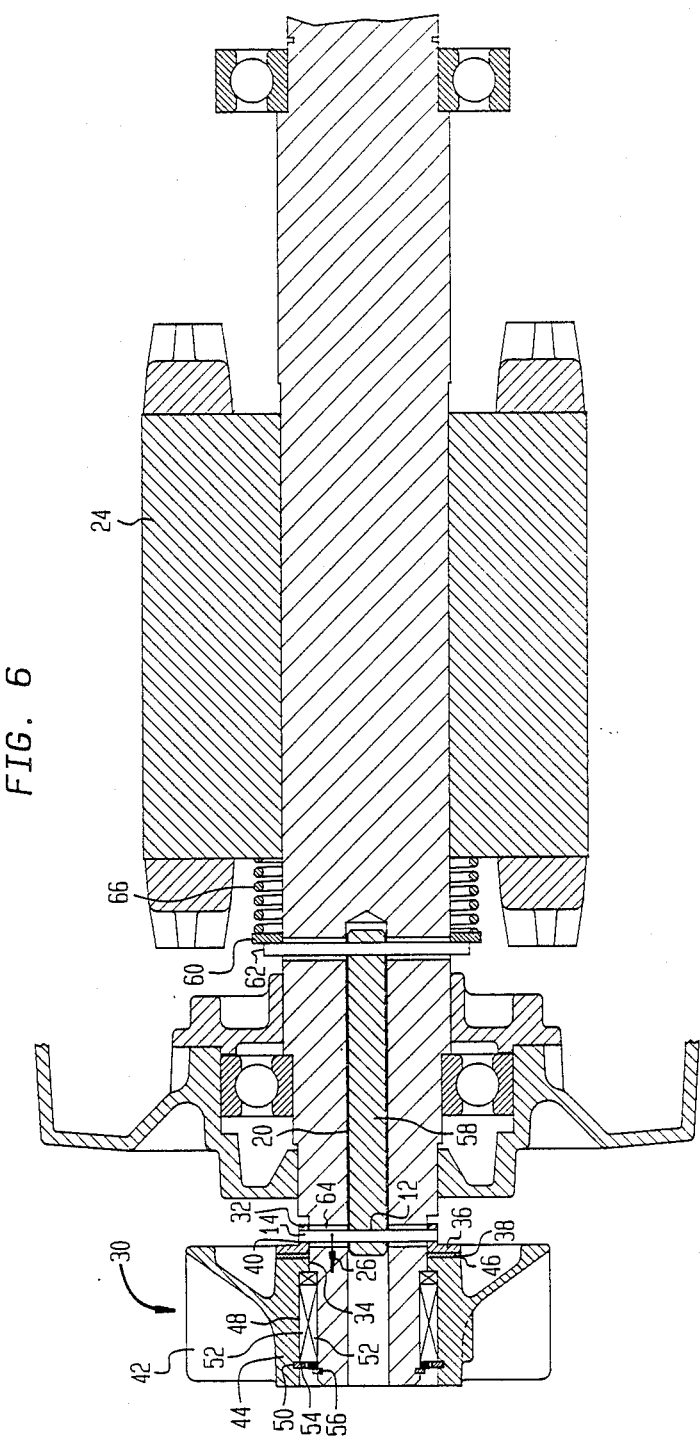

TEMPERATURE ACTIVATED COOLING FAN ASSEMBLY

BACKGROUND OF THE INVENTION

This invention relates to the efficient use of a fan for cooling, and, more particularly, to a cooling fan which operates intermittently and in response to a threshold temperature.

Typically, the least expensive apparatus for cooling an electric motor, internal combustion engine or the like is a cooling fan driven constantly from the shaft of the motor or engine. One problem with driving a fan constantly is that it takes energy to drive a fan. Since, in many applications it is not necessary to cool an apparatus constantly and, accordingly, not necessary to drive the fan constantly, it is desirable to drive the fan intermittently to conserve energy.

One method of driving a fan intermittently is to drive the fan through an electrically operated clutch. This type of clutch can be activated by means of a control circuit which senses the temperature of the cooled apparatus and engages or disengages the clutch accordingly. One problem with this type of fan operation is the cost of this type of clutch and the corresponding control circuit. For small motors and engines the amount of energy savings due to intermittent fan operation may not justify the cost of an electric clutch and control circuit.

Another problem with intermittently driven fans is the accurate detection of the temperature of the component for which the temperature must be regulated. For example, in an electric motor the rotor temperature may be the temperature which must be regulated. The temperature of the rotor could be measured indirectly from the temperature of a stationary part of the motor, or measured directly. One problem with indirect measurement is that an increased rotor temperature may lead the measured temperature excessively, resulting in thermal damage during the lead time. One problem with direct measurement is transferring the signal from a sensor, such as a thermocouple, on a moving element, such as a rotor, to a control circuit. Methods for this transfer, for example slip rings, are available but these methods are expensive and may not be reliable for the life of a motor, which in many cases is over ten years.

SUMMARY OF THE INVENTION

The present invention provides for a temperature-activated fan assembly comprising a fan for cooling, a torque transfer means engagable with the fan for transferring torque from the shaft of the cooled assembly to the fan, and a first member which expands in response to a temperature increase. The expansion causes the torque transfer means to engage the fan and causes the fan to rotate if the shaft is rotating.

An advantage of the present invention is its ability to react to a temperature change without the use of electronic sensors and the use of electronic circuitry. Another advantage of the invention, when used with a motor, is its ability to react to the rotor temperature within an acceptable amount of time.

BRIEF DESCRIPTION OF THE DRAWINGS

FIG. 2 is a side view of an expansion rod;

FIG. 2a is an end view of the expansion rod;

FIG. 3 is a cross-sectional view of a torque transfer means;

FIG. 3a is a end view of the torque transfer means;

FIG. 4 is a cross-sectional view of a fan assembly taken along line 4—4;

FIG. 4a is an end view of the fan assembly;

FIG. 5 is a side view of a motor shaft used in the first embodiment;

FIG. 6 illustrates a cross-sectional view of a motor rotor assembly including a second embodiment of the temperature activated fan assembly; and FIG. 7 is a side view of a motor shaft used in the second embodiment.

DETAILED DESCRIPTION OF THE PREFERRED EMBODIMENTS

Figure 1:
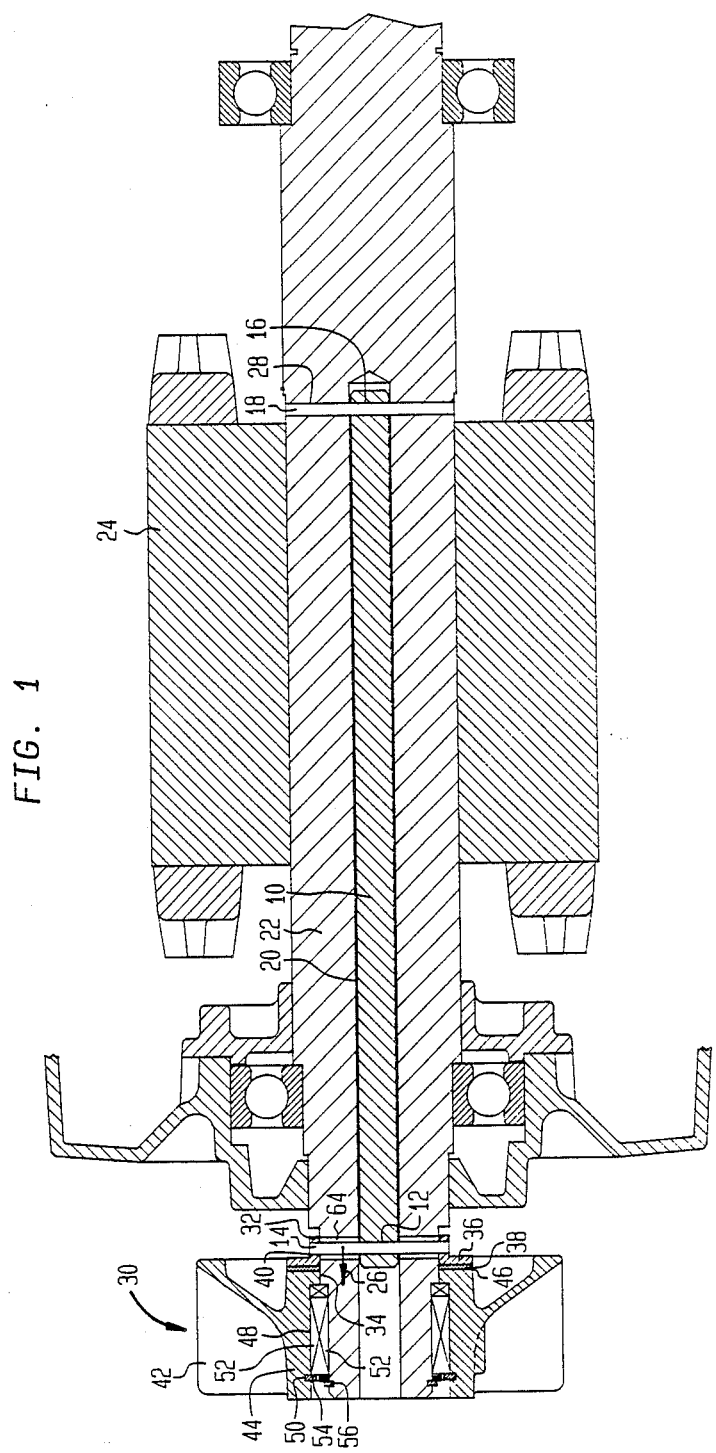
FIG. 1 illustrates a cross-sectional view of a motor rotor assembly including a first embodiment of the temperature activated fan assembly.

Referring now to the drawings, FIG. 1 illustrates a first embodiment of the temperature activated fan assembly for a motor. The active component of the assembly is the expansion rod 10. This rod is also illustrated in FIG. 2. As shown, the rod 10 includes a first opening 12 for engaging a translation pin 14. The rod 10 also includes a second opening 16 adapted to accept a pin 18 for restricting movement of the second end of the rod 10 within the axial bore 20. By way of example, the rod 10 can be fabricated from 6061-T6 aluminum or other suitable material which has a coefficient of thermal expansion significantly greater than that of the motor shaft 22.

In FIG. 1, the rod 10 is located within the axial bore 20 of the steel motor shaft 22. The rotor 24 is fixed to the shaft 22 and, during operation, this configuration causes the rod 10 to have substantially the same temperature as the rotor 24. Accordingly, when the rotor 24 heats up, the temperature of the rod 10 increases, causing the rod 10 to lengthen and urge the translation pin 14 in the direction of arrow 26. The translation pin 14 is urged in the direction of arrow 26 since the other end of the rod 10 is fixed within the axial bore 20 by the pin 18 and a hole 28.

FIG. 3 illustrates a torque transfer assembly engageable with a fan 30 for transferring torque to the fan 30. The torque transfer means includes a sleeve 32 adapted to translate upon a journal 34 of the shaft 22. The sleeve includes an opening 40 adapted to accept the translation pin 14. The torque transfer means also includes a first surface in the form of an annular disk 36 for transferring torque from the shaft 22 to the fan 30 through an annular disk 38 made of a friction material such as that presently found in many electric clutches.

The fan 30 is illustrated in FIGS. 1, 4, 4a and 6. The fan 30 includes fins 42, a hub 44 and a surface 46. The torque from the torque transfer means is transferred through the friction material 38 to the surface 46. By way of example, the friction material disk 38 is attached to the surface 46 by means of a suitable adhesive or similar means. The hub 44 also includes a bearing seat 48 and a snap ring groove 50. The cooperation of a bearing 52, the hub snap ring 54, the shaft snap ring 56, the shaft 22 and the hub 44 allow the fan to spin freely with respect to the shaft. This cooperation also prevents the fan 30 from translating along the shaft 22 while the disk 36 of the torque transfer means is being forced against the friction material 38 of the fan hub 44.

OPERATION OF THE FIRST EMBODIMENT

Referring again to FIG. 1, the operation of the assembly will now be explained. The operation of the fan 30 is based upon the engagement and disengagement of the torque transfer means with the fan 30. From a disengaged state, the fan 30 is engaged due to a temperature increase in the motor. When the temperature of the motor increases such that the temperature of the rod 10 increases, the length of the rod 10 increases in response to temperature increase. This axial expansion causes the translation pin 14 to move in the direction 26 within a shaft opening 64. The movement of the translation pin causes the disk 36 to be forced against the friction material 38 of the fan hub 44. When the force reaches a level to create a friction force, torque will be transferred from the shaft 22 to the fan 30 causing the fan 30 to spin under the power of the shaft 22. When the temperature of the motor and rod 10 decrease, the rod 10 contracts axially and the torque transfer means ceases to transfer torque to the fan.

SECOND EMBODIMENT

FIG. 6 illustrates a second embodiment of the invention. The second embodiment is different from the first embodiment in that the rod 10 of the first embodiment is replaced with a memory metal coil or spring 66 and an axial transfer rod 58. In the second embodiment the translation pin 14 is caused to move in direction 26 by the memory metal spring 66. A memory metal spring 66 has been chosen for the second embodiment because of the unique characteristics of memory metal. In general, memory metal has a memory effect with a threshold temperature. Above its threshold temperature, the metal has one structural form, and below its threshold temperature the metal has another structural form. The transition from one form to another may take place within 5 degrees Celsius of the threshold temperature. Accordingly, once the threshold temperature for the spring 66 is reached, full axial force can be applied to the translation pin 14 over a small temperature range.

By way of example one memory material, Nitinol, is claimed to have a threshold temperature setable within 1 degree Celsius.

OPERATION OF THE SECOND EMBODIMENT

The operation of the second embodiment is similar to that of the first embodiment, with the exception that the translation pin 14 is caused to move by the action of a memory metal spring 66. The memory metal spring 66 contacts the rotor 24 and expands, due to a structure change, very rapidly at a threshold temperature over a very small temperature range. Unlike the expansion of an aluminum rod, which is substantially linear with respect to temperature, the expansion of the memory metal spring 66 involves a structure change and occurs over a small temperature range. Accordingly, when the threshold temperature of the spring 66 is reached, the spring 66 forces against an annular disk 60 which causes the pin 62 to cause the axial transfer rod 58 to force the translation pin 14 in the direction 26. Since the structure change of the spring 66 takes place over a very small temperature range, the torque transfer means engages the fan 30 abruptly.

This embodiment has an advantage over the first embodiment in that the expansion of the rod 10 is substantially constant with respect to temperature, and accordingly during the expansion of the rod 10 the axial force will, at times, not be high enough to produce a friction force sufficient to prevent slipping between the disk 36 and the friction material 38. During slipping, the friction material 38 can wear, thus in the second embodiment the friction material 38 should last longer due to abrupt engagement.

While two embodiments of a temperature activated fan assembly and modifications thereof have been shown and described in detail herein, various other changes and modifications may be made without departing from the scope of the present invention. For example, the memory metal may take a form different from the spring to produce an axial force in response to a temperature change.

We claim:

1. A temperature activated fan assembly for a motor having a shaft, a rotor and a housing, the assembly comprising:
   a torque transfer means engageable with the fan for transferring torque to the fan, the torque transfer means including a sleeve adapted to translate on the shaft, and a first surface for transferring torque to the fan, the sleeve further including an opening adapted to accept a translation pin;
   a fan, the fan including a second surface through which the torque from the first surface is transferred to the fan;
   a friction material located between the first surface and the second surface for improving the transfer of torque between the first surface and the second surface;
   a memory metal member which expands in response to a temperature increase, the expansion causing the torque transfer means to engage the fan; and
   means for engaging the translation pin and the coil spring such that the translation pin causes the sleeve to translate on the shaft in response to the expansion of the coil spring, the translation pin engaging the shaft such that torque from the shaft is transferred to the torque transfer means.

2. A temperature activated fan assembly comprising:
   a fan;
   a sleeve adapted to translate on the shaft, the sleeve including a first surface for transferring torque to the fan, the sleeve further including an opening adapted to accept a translation pin; wherein the fan includes a second surface through which the torque from the first surface is transferred to the fan; and
   a first member which expands in response to a temperature increase, the first member including means for engaging the translation pin such that the translation pin causes the sleeve to translate on the shaft in response to the expansion of the first member, the translation pin engaging the shaft such that torque from the shaft is transferred to the torque transfer means.

3. The temperature activated fan assembly of claim 2, wherein the first member is an aluminum rod.

4. The temperature activated fan assembly of claim 2, wherein the first member is a memory metal rod.

5. The temperature activated fan assembly of claim 3, further comprising a friction material located between the first surface and the second surface for improving the transfer of torque between the first surface and the second surface, wherein the shaft includes an axial bore adapted to accept the rod, the rod defining a first end, a second end and an opening at the second end adapted to accept a pin for restricting movement of the second end of the rod within the axial bore, the means for engaging the translation pin including an opening at the first end.

6. The temperature activated fan assembly of claim 4, further comprising a friction material located between the first surface and the second surface for improving the transfer of torque between the first surface and the second surface, wherein the shaft includes an axial bore adapted to accept the rod, the rod defining a first end, a second end and an opening at the second end adapted to accept a pin for restricting movement of the second end of the rod within the axial bore, the means for engaging the translation pin including an opening at the first end.

7. A temperature activated fan assembly comprising:
   a fan;
   a memory metal coil which expands in response to a temperature increase, a torque transfer means coupled to a shaft engagable with the fan for transferring torque to the fan, the torque transfer means including a sleeve adapted to translate on the shaft and a first surface for transferring torque to the fan, the sleeve including an opening adapted to accept a translation pin, the fan including a second surface through which the torque from the first surface is transferred to the fan;
   means for engaging the translation pin and the coil such th1at the translation pin causes the sleeve to translate on the shaft in response to the expansion of the coil, the translation pin engaging the shaft such that torque from the shaft is transferred to the torque transfer means; and
   a friction material located between the first surface and the second surface for improving the transfer of torque between the first surface and the second surface.

8. A temperature activated fan assembly for a motor having a shaft, a rotor and a housing, the assembly comprising:
   a torque transfer means engageable with the fan for transferring torque to the fan, the torque transfer means including a sleeve adapted to translate on a shaft and a first surface for transferring torque to the fan, the sleeve further including an opening adapted to accept a translation pin;
   a fan, the fan including a second surface through which the torque from the first surface is transferred to the fan; and
   a rod which expands in response to a temperature increase, the expansion causing the torque transfer means to engage the fan, the rod including means for engaging the translation pin such that the translation pin causes the sleeve to translate on the shaft in response to the expansion of the first member, the translation pin engaging the shaft such that torque from the shaft is transferred to the torque transfer means.

9. The fan assembly of claim 8 further comprising a friction material located between the first surface and the second surface for improving the transfer of torque between the first surface and the second surface, wherein the shaft includes an axial bore adapted to accept the rod, the rod defining a first end, a second end and an opening at the second end adapted to accept a pin for restricting movement of the second end of the rod within the axial bore, the means for engaging the translation pin including an opening at the first end.

* * * * *